Figures 1, 2:
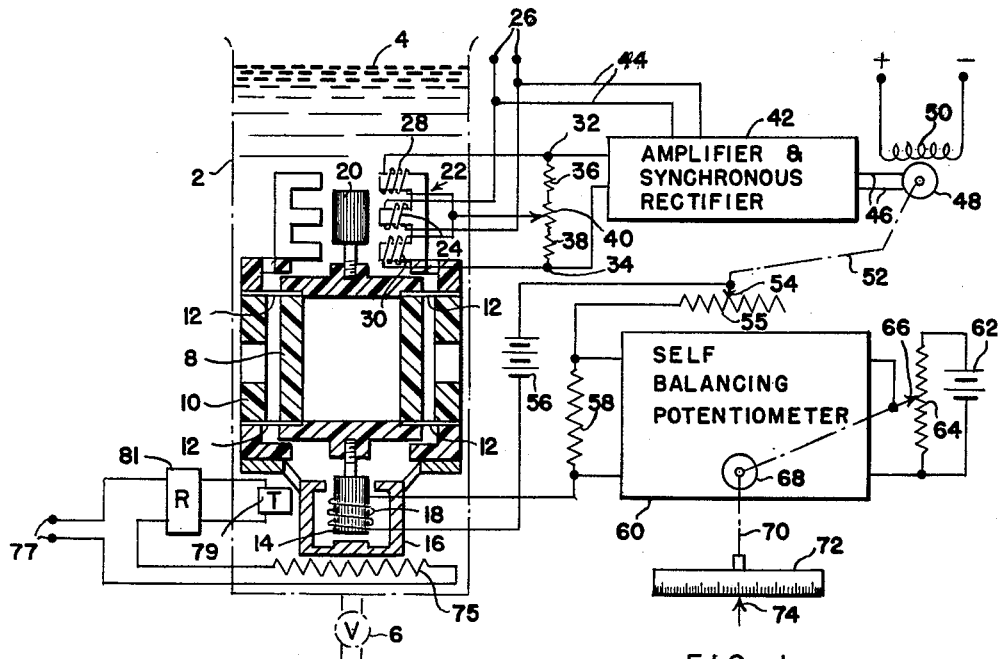

Nov. 3, 1964  C. W. HARGENS III, ET AL  3,154,950
APPARATUS FOR SPECIFIC GRAVITY MEASUREMENTS
Filed Nov. 14, 1955

INVENTORS
CHARLES W. HARGENS, III
& GEORGE A. SMITH
BY
ATTORNEYS

United States Patent Office 3,154,950
Patented Nov. 3, 1964

3,154,950
APPARATUS FOR SPECIFIC GRAVITY MEASUREMENTS
Charles W. Hargens III, Enfield, and George A. Smith, Philadelphia, Pa., assignors to Louis Forman, Jenkintown, Pa.
Filed Nov. 14, 1955, Ser. No. 546,479
7 Claims. (Cl. 73—453)

This invention relates to apparatus for specific gravity measurements of liquids and particularly to apparatus for the rapid determination of proof of alcoholic liquors.

For simplicity of description the apparatus constituting the invention will be particularly described with reference to the determination of proof of distilled spirits, though it will be evident that it is applicable to the determination of density or specific gravity of liquids generally, whether heavier or lighter than water, giving indications in terms of any desired units applicable to the liquid involved, for example, proof or alcoholic content in the case of alcoholic liquors, specific gravity, degrees Baumé, sugar or salt content, in the case of solutions, or the like.

Proof in the case of alcoholic liquors or specific gravity in various units in the case of other liquids, are generally measured through the use of hydrometers, the readings of which must be corrected for temperature in order to give a measure of what is usually desired, namely the content of some constituent of the liquid. A high degree of accuracy may be thus obtained but, as will be evident, direct reading is usually not accomplished. In particular, a high degree of accuracy of reading is required in the case of alcoholic liquors both for control and determination of tax liability in view of the high rate of taxes applicable to the alcoholic content thereof. Furthermore, relatively large quantities of alcoholic liquors must be used in making hydrometer determinations and wastage is a matter of considerable expense.

It is the general object of the present invention to provide apparatus for the determination of specific gravity having a high accuracy and utilizing only a small quantity of the liquid in the determination, the quantity being so small that it may be readily brought to a standard temperature with resulting indication or recording of the desired measurement value of the quantity desired reduced to some standard temperature conditions. In the case of alcoholic liquors, for example, a proof reading may be obtained referred to the standard temperature required for reference.

In particular, the invention involves the use of a member subject to buoyant forces by the liquid associated with means for detecting to a high degree of accuracy a particular position thereof in association with other means for applying a balancing force to maintain the member, at least on the average, in its predetermined zero position. The member subject to buoyant forces may be either heavier or lighter than the liquid which it displaces, and for convenience will be hereafter referred to as "float" even though it may be heavier than the liquid.

The attainment of the objectives indicated as well as other objects of the invention will become apparent from the following description, read in conjunction with the accompanying drawing, in which:

FIGURE 1 is an electrical and mechanical diagram, with certain parts shown in section of one embodiment of the invention; and FIGURE 2 is a similar diagram showing an alternative embodiment of the invention.

Referring first to FIGURE 1, there is indicated at 2 a suitable container for the liquid 4 of which the density is to be measured, the container 2 being provided with a drain valve 6. This container may have any physical form suitable to the liquid undergoing measurement and, accordingly, is only diagrammed in the figure. The apparatus which operates to make the measurement is immersed in the liquid 4 and comprises a float 8 which may be made up of plastic elements cemented together and supported by elements 12 from a frame 10 suitably fixed in position in the container. The elements 12 which support the float may desirably comprise light filaments of a material such as nylon arranged radially at the top and bottom of the float under light tension when the float is in its zero position so as to exert only minute restraints on vertical movements of the float above and below such zero position. As will be evident from considering FIGURE 1, if the filaments 12 are horizontal when the float is in zero position there will be substantially zero restraint against slight vertical movements while at the same time the float is very effectively restrained against horizontal or tilting movements. Alternatively, thin flat spring members may be used offering only very small restraint to the float in its zero position. As will appear, the float requires an extent of vertical movement only of the order of a few thousandths of an inch, and the frame 10 is desirably provided with upper and lower flanges so arranged as to limit the float to a very small range of movement above and below its zero position. Thus, in particular, the assembly is made portable without possibility of damage due to shock, there being no possibility that the filaments 12 shall be strained beyond their elastic limits except by very rough handling. As shown in FIGURE 1, the float has secured to its bottom end a magnetic core 14, desirably of nonretentive characteristics provided, for example, by an iron core of conventional type. Surrounding this is a magnetic circuit-forming arrangement 16 rigidly supported by the frame 10 and enclosing a coil diagrammed at 18, the arrangement being such that the field produced by energization by the coil 18 will exert a downward force on the core 14 and the float. As will appear, the arrangement is such as to maintain the core in a substantially definite position with respect to the fixed coil 18 and housing 16 during operation so that the force exerted on the core is directly proportional to the current flowing through the coil 18, all operations being carried out under conditions far short of magnetic saturation of the magnetic circuit involved. To the upper end of the core there is provided a highly sensitive detector of its zero position and this is conventionally diagrammed in FIGURE 1 as comprising a core 20 of iron or the like associated with a differential transformer arrangement indicated at 22 which is provided with a winding 24 receiving an alternating current supply from terminals 26 and a pair of secondary coils 28 and 30 arranged in series opposition with their outer terminals connected to terminals 32 and 34. Zero position detecting units of this type are well-known and are generally in a form having circular symmetry about the axis of the core 20, the position of which is to be detected. In principle, however, they act identically with the diagrammed arrangement, a zero output at terminals 32 and 34 being provided when the core 20 has a zero position defined by electromagnetic symmetry with magnetic poles associated with the coils 28 and 30, the output of inducted current changing phase as the core 20 moves through its zero position. The zero position of the float should correspond to the zero position of the core 20, and for fine adjustment to make the electromagnetic zero correspond with the mechanical zero, the latter involving horizontal position of the supporting filaments 12, the connection between the coils 28 and 30 may be made to the contact of a potentiometer of 40 located in series with upper and lower resistors 36 and 38 between the terminals 32 and 34. By adjustment of the potentiometer contact correction may be made to secure a zero potential between terminals 32 and 34 for zero position of the float, this correcting for slight differences which may exist causing departure from electromagnetic symmetry of the detecting means.

The terminals 32 and 34 are connected to the input of the conventional alternating current amplifier and synchronous rectifier 42 which receives reference voltage through connections 44 from the alternating supply terminals 26. The output of the synchronous rectifier is delivered at 46 to a small direct current motor 48 having a direct field which is diagrammed as supplied by winding 50 though, in practice, a permanent magnetic field would be used.

The operation of what has just been described is such as to produce reverse operations of motor 48 for very slight deviations of core 20 above and below its zero position, the deviations producing motor operation being of the order of a thousandth of an inch. While conventional 60 cycle alternating current may be supplied to the terminal 26, better sensitivity may be secured by utilizing a higher frequency supply of an order of 400 to 1,000 cycles or more. Utilizing high amplification of the signals received from terminals 32 and 34 and relating the amplified signal to the input through connections 44 in the synchronous rectifier, there is then secured a direct current at connections 46 which changes sign as the core 20 passes through zero, thus providing reversal of rotation of motor 48. A phase detecting arrangement is thus provided which may be replaced if desired, by other phase detecting arrangements of well-known types. It will be evident that similar reverse motor operations can be secured utilizing alternating current motors, feeding one winding thereof with the amplified output from the terminals 32 and 34 and the other winding thereof from the supply terminals 26. However, operation of this sort is limited to relatively low frequency supplies and high sensitivity with less amplification is secured by utilizing the arrangement illustrated with higher frequency supplied.

The motor 48 is arranged to drive through mechanical connections illustrated at 52 the contact 54 of a rheostat 55 which is connected in series with a battery 56, coil 18, and a resistance 58 of standard value desirably of a type having a very low temperature coefficient. The potential across the resistor 58 is provided to a self-balancing potentiometer 60 of conventional type provided with a motor 68 driving the contact 66 of potentiometer 64 supplied with a standard potential from a battery 62 standardized by a standard cell. The operation is conventional, balancing the input potential across resistor 58 against that existing between contact 66 and one end of the potentiometer resistance 64. The mechanical output from the motor 68 indicated at 70 drives a graduated dial 72 which may be read against a reference marker 74. Instead of using motor 48 to control current through coil 18 and resistor 58, electron tube control may be used for this purpose.

The overall operation is as follows:

The float assembly comprising the float proper 8 and the cores 14 and 20 is lighter than the liquid 4 and consequently without the application of additional force thereto it would rise above its zero position. This supplies a corresponding signal at terminals 32 and 34 which effects drive of motor 48 in such direction as to adjust contact 54 to produce a current flow through coil 18 to provide a downward force on the float assembly to restore the core 20 to zero position. If this position is overrun, a reverse signal occurs reducing the current through coil 18. If sufficient damping is involved in the system, the ultimate result will be that just sufficient current flows through the coil 18 to maintain the core 20 in fixed position. If there is less than critical damping, hunting may occur in which case the float assembly will oscillate about its zero position and the current through coil 18 will correspondingly oscillate about an average value corresponding to the required force which would maintain the float assembly in zero position. Desirably adjustments are made in the usual fashion, through the use of a suitable time constant arrangement in the synchronous rectifier to bring the system approximately to the critical damping condition taking into account the characteristics of motor 48 and the hydraulic damping of the float assembly by the liquid. However, the slight oscillations are not objectionable and may be damped out in the potentiometer. The current through coil 18 measures the force required to balance the float assembly and this current is directly proportional to the potential drop across the resistor 58 and consequently there will be indicated on the dial 72 a measurement corresponding thereto. Obviously, the dial 72 may be directly calibrated in terms of specific gravity, proof, constituent content of the liquid, or any other desired quantity which is to be indicated. The potentiometer, of course, may be of a recording rather than an indicating type.

High accuracy is achieved by reason of the fact that during operation the physical relationship between the core 14 and coil 18 is maintained constant, or on the average constant, considering the possibility that there may be slight oscillation of the system. With this relationship, the force is then always directly proportional to the current flowing through the coil 18 and there is no need to take into account the quite variable and generally indeterminable functional relationship which would exist between the force exerted and the current flowing through the coil for various positions of the core 14. In other words, the float is brought to a mechanical null condition making valid the assumption of linearity of relationship between the force and the flowing current.

For the purpose of providing direct readings it is desirable to maintain a definite temperature of the liquid at the time a determination of its specific gravity is made and for this purpose it should be heated under thermostatic control to a definite temperature which for use of the apparatus in all normal temperature conditions should be a temperature somewhat exceeding the highest ambient temperature which could be expected to exist. Thermostatically controlled heating means is indicated in FIGURE 1 as comprising a heating resistance 75 in a circuit supplied from terminals 77 and including a thermostat 79 immersed in the liquid and connected to a relay 81 for controlling current flow through the heating resistance. Desirably the resistance should be disposed throughout the volume of the liquid so as to rapidly and uniformly effect heating to the desired temperature without production of disturbing convection currents in the liquid.

While indicated in diagrammatic form in FIGURE 1, the container and the apparatus therein may be quite small so that the quantity of liquid required for measurement may be correspondingly small and of the order of upwards of ten milliliters.

It may be remarked that the cores 20 and 18 and their associated coil asemblies may be above the surface of the liquid if desired, being then connected to the immersed float by a stiff wire of small cross-section so that its movements through the liquid surface will have a minimum effect on sensitivity.

The same principle of maintaining a member subject to buoyant forces in a zero position with measurement of the force required to maintain it there, may be applied in various other fashions of which FIGURE 2 is illustrative. In this figure a housing is provided at 76 which may be formed of plastic elements stacked on each other and secured together either by adhesive or by clamping means with the interposition of gaskets. A float is indicated at 78 which may be of cylindrical form and provided within its wall portions with a cavity 80 to provide the proper effective specific gravity. A central opening 82 is in communication with the liquid undergoing measurement and may be in the form of a rather narrow, substantially rectangular opening which, as will later appear, serves for the reception of a chain. Filaments 84 extending radially and corresponding to the filaments previously described restrain the float against horizontal and tilting movements while leaving it free without substantial restraint for vertical movements about a position corresponding to horizontal position of the filaments. One of the filaments 84, indicated as 84', may have incorporated therein by braiding highly flexible conductive metallic strands, or may be rendered conductive by metal sputtering or in some other fashion, to provide an electrical connection from the exterior of the housing to a contact element 86 arranged to engage a contact 88 carried by a flexible spring member 89 arranged for accurate positioning of contact 88 by an adjustable screw 90. Adjustment is so made that first contact occurs upon upward movement of the float when the float is in zero position as determined by the horizontal position of the supporting elements 84. Direct current is supplied at 92 to the arrangement of contacts 86 and 88 in series with a relay 94 which is of reversing type to control reversibly the supply of current, also from terminals 92, to the direct current motor 96 which may be provided with a permanent magnetic field or, as diagrammed, with a wound field supplied with direct current. The motor 96 is arranged to drive through mechanical connections indicated at 99, and which may contain reduction gearing, a rod 100 mounted for vertical movement and supporting at its lower end one end of a chain 104, the other end of which is connected to the central portion of the float at 105, there being provided a loop 106 depending within the opening 82 in the float and, as the rod 100 is further lowered, possibly entering an opening 108 in the lower portion of the housing with the ultimate attainment of a limiting position indicating at 110. Desirably the rod 100 and the upper portion of the chain connected thereto pass through a neck 102 of the housing surmounted by a basin 112 to receive the liquid undergoing measurement displaced by the rod 100, the liquid being placed in the apparatus so that its upper level is in the basin. The openings 82 and 108 are desirably flat and in alignment so that when the apparatus is vertical the chain will clear their walls but, at the same time, has such limit against free movement that it cannot become permanently twisted or otherwise snarled.

The motor 96 through mechanical connections 114 which may contain reduction gearing, drives a dial 116 associated with a marker 118 and which is indicative of the vertical position of the rod 100. This dial 116 corresponds to dial 72 of FIGURE 1 and may be calibrated in similar fashion.

The operation is as follows:

The portion of the chain between its connection to the float and the horizontal lowermost portion of the loop at 106 provides by its effective weight (considering the buoyancy of the liquid) a downward force opposing the net upward force on the float exerted by the liquid, the float assembly being lighter than the liquid so that some additional downward force is required to maintain it balanced against vertical movement. Assuming that in starting the apparatus into operating the float is buoyed upwardly to produce contact at 86, 88, the relay will be energized to produce rotation of motor 96 in such direction as to lower rod 100 and the chain 104 to provide a greater length of chain between 105 and its lowermost portion 106. When the amount of chain so provided is sufficient to overcome the existing upward force due to buoyancy on the float 78, contact is broken and the relay opens to reverse the operation of the motor. This, in turn, effects lifting of the chain and reestablishment of contact. A very slight hunting action is thus set up about that position of the rod 100 corresponding to precise balance such as would maintain the float in zero position with the contacts 86 and 88 just in an engagement. The dial 116 may slightly vibrate but the average position may be easily read. Other means for detecting a zero position of the float may be used, as, for example, a differential transformer, a capacitive device, or a mechano-electrical transducer.

The chain 104 desirably has very fine links rounded and polished to provide a minimum of friction opposing flexure between adjacent links. The links may be of gold or platinum or of other noncorrodible material. It may be noted that a portion of the chain between the lowermost point of the bend thereof and the rod 100 is of no materiality in determining the downward force exerted on the float.

The apparatus of FIGURE 2 is desirably temperature controlled in the fashion described in connection with FIGURE 1.

The principle here involved may be carried out in various other ways. A zero position of a float, in which position it is substantially unrestrained against vertical movements may be determined in various other fashions than by electromagnetic means such as exemplified in FIGURE 1, or contact making means as exemplified in FIGURE 2, there being usuable capacitance measuring means, photoelectric detecting means, or electromechanical transducers such as those involving displacement through an externally extending rod of a movable electrode of a thermionic tube. A force for restoring a float to null position may also be applied in various ways other than by application of an electromagnetic force of the type exemplified in FIGURE 1 or by the application of a direct mechanical force as exemplified in FIGURE 2. In any case, the fact that balancing occurs about the same zero position of the float during operation insures that the force is definitely determined without regard to a relationship which might exist as a function of float position.

It is to be understood that the invention is not to be regarded as limited except as required by the following claims.

What is claimed is:

1. In combination, a container for a liquid, a member, means locating said member in liquid in the container and mounting it for vertical movement under the buoyant action of the liquid, said means providing substantially no restraint to said member against vertical movement in a limited range, electromagnetic means of balanceable magnetic circuit type providing an electrical signal of relationship of the position of said member to a predetermined position thereof within said limited range, phase sensitive means receiving said signal and providing a reversible direct current output indicative of the position of said member relative to said predetermined position, means positionable by said output and reversible therewith in accordance with the last mentioned position, electromagnetic means for applying directly to said member a vertical magnetic force balancing the buoyant action of the liquid to locate said member substantially in said predetermined position, and means indicating the magnitude of said force when the means positionable by said output has a position corresponding to the location of said member in said predetermined position, so that the indication of the magnitude of said force at that time is a measure of the specific gravity of said liquid.

2. In combination, a container for a liquid, a member, means locating said member in liquid in the container and mounting it for vertical movement under the buoyant action of the liquid, said means providing substantially no restraint to said member against vertical movement in a limited range but constraining it substantially entirely to vertical movement, electromagnetic means of balanceable magnetic circuit type providing an electrical signal of relationship of the position of said member to a predetermined position thereof within said limited range, phase sensitive means receiving said signal and providing a reversible direct current output indicative of the position of said member relative to said predetermined position, means positionable by said output and reversible therewith in accordance with the last mentioned position, electromagnetic means for applying directly to said member a vertical magnetic force balancing the buoyant action of the liquid to locate said member substantially in said predetermined position, and means indicating the magnitude of said force when the means positionable by said output has a position corresponding to the location of said member in said predetermined position, so that the indication of the magnitude of said force at that time is a measure of the specific gravity of said liquid.

3. In combination, a container for a liquid, a member, means locating said member in liquid in the container and mounting it for vertical movement under the buoyant action of the liquid, said means providing substantially no restraint to said member against vertical movement in a limited range, electromagnetic means of balanceable magnetic circuit type providing an electrical signal of relationship of the position of said member to a predetermined position thereof within said limited range, means positionable by said signal and reversible therewith in accordance with the last mentioned position, electromagnetic means for applying directly to said member a vertical magnetic force balancing the buoyant action of the liquid to locate said member substantially in said predetermined position, and means indicating the magnitude of said force when the means positionable by said signal has a position corresponding to the location of said member in said predetermined position, so that the indication of the magnitude of said force at that time is a measure of the specific gravity of said liquid.

4. In combination, a container for a liquid, a member, means locating said member in liquid in the container and mounting it for vertical movement under the buoyant action of the liquid, said means providing substantially no restraint to said member against vertical movement in a limited range, electromagnetic means of balanceable magnetic circuit type providing an electrical signal of relationship of the position of said member to a predetermined position thereof within said limited range, electromagnetic means responsive to said signal for applying directly to said member a vertical magnetic force to locate it substantially in said predetermined position, and means indicating the magnitude of said force.

5. In combination, a container for a liquid, a member, means locating said member in liquid in the container and mounting it for vertical movement under the buoyant action of the liquid, said means providing substantially no restraint to said member against vertical movement in a limited range, electromagnetic means of balanceable magnetic circuit type providing an electrical signal of relationship of the position of said member to a predetermined position thereof within said limited range, phase sensitive means receiving said signal and providing a reversible direct current output indicative of the position of said member relative to said predetermined position, electromagnetic means responsive to said output for applying directly to said member a vertical magnetic force to locate it substantially in said predetermined position, and means indicating the magnitude of said force.

6. In combination, a container for a liquid, a member, means locating said member in liquid in the container and mounting it for vertical movement under the buoyant action of the liquid, said means comprising solely a plurality of flexible elements symmetrically diverging from a central axis of said member and providing substantially no restraint to said member against vertical movement in a limited range, means providing an electrical signal of relationship of the position of said member to a predetermined position thereof within said limited range, means positionable by said signal and reversible therewith in accordance with the last mentioned position, means for applying to said member a force balancing the buoyant action of the liquid to locate said member substantially in said predetermined position, and means indicating the magnitude of said force when the means positionable by said signal has a position corresponding to the location of said member in said predetermined position, so that the indication of the magnitude of said force at that time is a measure of the specific gravity of said liquid.

7. In combination, a container for a liquid, a member, means locating said member in liquid in the container and mounting it for vertical movement under the buoyant action of the liquid, said means comprising solely a plurality of flexible elements symmetrically diverging from a central axis of said member and providing substantially no restraint to said member against vertical movement in a limited range but contraining it substantially entirely to vertical movement, means providing an electrical signal of relationship of the position of said member to a predetermined position thereof within said limited range, means positionable by said signal and reversible therewith in accordance with the last mentioned position, means for applying to said member a force balancing the buoyant action of the liquid to locate said member substantially in said predetermined position, and means indicating the magnitude of said force when the means positionable by said signal has a position corresponding to the location of said member in said predetermined position, so that the indication of the magnitude of said force at that time is a measure of the specific gravity of said liquid.

References Cited in the file of this patent

UNITED STATES PATENTS

| | | |
|---|---|---|
| 2,082,539 | Fischer | June 1, 1937 |
| 2,530,981 | Mikina | Nov. 21, 1950 |
| 2,602,660 | Shannon | July 8, 1952 |
| 2,635,461 | Groth et al. | Apr. 21, 1953 |
| 2,727,392 | Hazard et al. | Dec. 20, 1955 |
| 2,780,101 | Kinkel | Feb. 5, 1957 |
| 2,788,664 | Coulbourne et al. | Apr. 15, 1957 |
| 2,820,364 | Bevins et al. | Jan. 21, 1958 |